(12) United States Patent
Fritz et al.

(10) Patent No.: US 11,391,572 B2
(45) Date of Patent: Jul. 19, 2022

(54) METHOD FOR PREDICTING TOPOGRAPHY INFORMATION

(71) Applicant: DEERE & COMPANY, Moline, IL (US)

(72) Inventors: Norbert Fritz, Ilvesheim (DE); Bernd Baum, Dannstadt-Schauernheim (DE); Sebastian Illy, Worms (DE); Thomas Floerchinger, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 148 days.

(21) Appl. No.: 15/914,327

(22) Filed: Mar. 7, 2018

(65) Prior Publication Data

US 2018/0266829 A1    Sep. 20, 2018

(30) Foreign Application Priority Data

Mar. 14, 2017 (DE) .......................... 102017204239.7

(51) Int. Cl.
*G01C 21/20* (2006.01)
*B60W 50/00* (2006.01)
(Continued)

(52) U.S. Cl.
CPC ............. *G01C 21/20* (2013.01); *B60W 30/18* (2013.01); *B60W 50/0097* (2013.01);
(Continued)

(58) Field of Classification Search
CPC ... G01C 21/30; G01C 21/3822; B60W 30/18; B60W 50/0097; B60W 2300/15; B60W 2300/152; B60W 2550/14; B60W 2550/402; B60W 30/04; B60W 40/112; B60W 50/14; B60W 20/102; B60W 20/11; B60W 30/08; B60W 30/095; B60W 40/076; B60W 2550/142; B60W 2552/15; G06N 5/04; A01B 69/00; A63B 2067/025; B60G 2800/704; B60Y 2300/08;
(Continued)

(56) References Cited

U.S. PATENT DOCUMENTS 7,272,474 B1    9/2007 Stentz et al.
7,593,798 B2    9/2009 Han et al.
(Continued)

FOREIGN PATENT DOCUMENTS

DE            19544112 A1    5/1997
DE       102011078292 A1    1/2013
(Continued)

OTHER PUBLICATIONS

European Search Report issued in counterpart application No. 18161145.0 dated Aug. 2, 2018. (7 pages).
(Continued)

*Primary Examiner* — Christian Chace
*Assistant Examiner* — Aaron C Smith

(57) ABSTRACT

A method for predicting a topography information item for a vehicle includes assigning at least one respective topography information item to each of the different travel positions of the vehicle, determining a future travel position, and querying at least one topography information item assigned to the determined future travel position.

9 Claims, 3 Drawing Sheets

(51) Int. Cl.
*B60W 30/18* (2012.01)
*G06N 5/04* (2006.01)

(52) U.S. Cl.
CPC ........... *G06N 5/04* (2013.01); *B60W 2300/15* (2013.01); *B60W 2300/152* (2013.01); *B60W 2552/00* (2020.02); *B60W 2556/50* (2020.02)

(58) Field of Classification Search
CPC ... B60Y 2300/095; B63B 71/00; B63B 79/30; B66B 2001/2483; B64C 2201/123; B60L 15/2018; B60L 15/2081; B60L 2240/642; B60T 10/00; B62D 55/116; B65H 2301/41447; E21B 47/02; F02D 41/1482; F16D 2500/3125; F16D 2500/3127; F16H 59/66; F16H 2059/142; F16H 2059/663; F16H 2057/02056; F27D 2003/0093; F02M 35/164; F16C 2310/00; F03D 9/48; G01N 2033/245; G05B 2219/45017; H04W 40/205; H01J 2237/2814; Y02A 90/32; Y02T 10/6291
See application file for complete search history.

(56) References Cited

U.S. PATENT DOCUMENTS

| | | | |
|---|---|---|---|
| 2009/0157566 A1* | 6/2009 | Grush | G01C 21/28 705/400 |
| 2011/0022267 A1* | 1/2011 | Murphy | B60W 30/04 701/38 |
| 2012/0066232 A1* | 3/2012 | Engelhardt | G06F 16/29 707/748 |
| 2014/0172225 A1 | 6/2014 | Matthews et al. | |
| 2014/0244151 A1* | 8/2014 | Matsubara | B60W 30/095 701/301 |
| 2014/0350819 A1* | 11/2014 | Johansson | B60K 31/00 701/93 |
| 2016/0092621 A1* | 3/2016 | Hu | G06F 17/509 703/6 |
| 2017/0101103 A1* | 4/2017 | Foster | A01B 63/002 |
| 2017/0357267 A1* | 12/2017 | Foster | A01B 79/005 |

FOREIGN PATENT DOCUMENTS

| | | | | |
|---|---|---|---|---|
| DE | 102015205210 A1 | 9/2016 | | |
| JP | 04204395 A | * | 7/1992 | |
| WO | WO-2016068749 A1 | * | 5/2016 | ............ B60W 30/00 |

OTHER PUBLICATIONS

German Search Report issued in counterpart application No. 102017204239.7 dated Dec. 11, 2017 (10 pages).

* cited by examiner

METHOD FOR PREDICTING TOPOGRAPHY INFORMATION

RELATED APPLICATIONS

This application claims priority to German Patent Application Ser. No. 102017204239.7, filed Mar. 14, 2017, the disclosure of which is hereby expressly incorporated by reference in its entirety.

FIELD OF THE DISCLOSURE

The present disclosure relates to a method for predicting topography information for a vehicle.

BACKGROUND

For controlling specific functions of a vehicle, it can be of interest to determine information regarding topographical properties at different driving positions of the vehicle. In this disclosure, embodiments are presented which enable a prediction of topographical information in a simple and efficient manner.

SUMMARY

In one embodiment of this disclosure, a method enables topographical detection of future travel positions by a prediction of a topography information item in the region of a determined future travel position of the vehicle. Different travel positions of the vehicle are each assigned at least one topography information item. As soon as a future travel position for the vehicle has been determined, the topography information already assigned to this future travel position can be queried.

This queried and predicted topography information item (e.g., ground slope, rolling resistance coefficient, traction coefficient) can be used in particular to control the vehicle such as the engine, the drivetrain, or the drive performance thereof accordingly, and to achieve a more efficient driving performance and a reduced fuel consumption along the travel path. The determination of a future travel position also supports the efficiency of the method because a corresponding processing and control unit then has sufficient time to control the driving of the vehicle for a defined future point in time efficiently.

The vehicle may be a utility vehicle, particularly a construction machine or an agricultural vehicle (e.g., a harvester, mower, tractor, towing vehicle).

The topography information can in principle be any topographical property, a terrain feature or a physical parameter in a region of a travel position of the vehicle. The topography information items can be detected and processed in part or completely by technical means of the vehicle itself (e.g., by measuring or receiving data at a travel position) or by other data sources, i.e., in particular independently of a determined travel position. A single topography information item or a plurality of topography information items can be assigned to a determined travel position.

A topography information item can be assigned to a given travel position by providing or defining an arrangement of geographically different cells and representing different travel positions (e.g., current and future travel positions) by respective cells. The topography information item is assigned to a cell. This achieves a simple correlation in terms of information technology between topography information items and travel positions. If cells are used, the determination of a future travel position is replaced or supplemented by a determination of a future cell. Thus, a future travel position can first be determined and a future cell representing this travel position can be determined therefrom. The reverse case, of determining a future cell and determining a future travel position derived therefrom, is likewise possible.

The cell need not necessarily represent a surface. The cells can also be individual network or grid points of a coordinate system subdivided in the manner of a network or a grid. The cells are jointly components of a geographical surface. The desired arrangement of geographical cells can be provided in a mathematically simple manner by subdividing a geographical surface into defined cells by predetermined geographic longitudinal and latitudinal information. It is advantageous for the performance of the method in this regard to use a satellite-based position detection, which is available or used by the vehicle in any case as a basis for the definition of the cells. For example, the longitudinal or latitudinal information provided by the satellite-based position detection system (e.g., GPS, Galileo) can be used or can be subdivided more finely with a defined scale value to generate suitable cells for the method.

Current travel positions of the vehicle are advantageously also detected by means of a (or the same aforementioned) satellite-based position detection system and provided as data for carrying out the method.

Similarly, detected current travel positions or determined future travel positions of the vehicle can be represented by a cell by comparing the position data or position coordinates of the respective travel position to corresponding data of cells and determining the correct cell on the basis of the comparison result.

In another embodiment, a data record is generated which contains at least one topographical information item and additional information items or data. This data record is assigned to a cell so that at least one topography information item is assigned to a cell. In this manner, a topography information item assigned to a determined future travel position or a determined future cell can be queried with little technical effort. It is only necessary to provide or query the data record of the determined future cell.

As already mentioned, a respective data record is assigned to each of the individual cells. In a further embodiment, the data record or at least a part of the content of the data record (e.g., topography information, position coordinate) is generated by technical means of the vehicle itself when the vehicle approaches or crosses or has already crossed the corresponding cell. In a single trajectory or multiple trajectories, the vehicle crosses an increasing number of cells and more and more topography information items or data records with corresponding topography information items are accordingly generated. The data records can also be generated automatically by means of a corresponding algorithm and suitable processing units and filled with topography information items. As the number of cells with topography information items increases, the database becomes larger and the method more and more accurate.

At least one topography information item is updated (e.g., by importing a new measured value or by a new averaging process) when the vehicle approaches or crosses or has already crossed the corresponding cell. This contributes to making the predicted topography information items at a determined future travel position more up-to-date and thus more accurate. This measure is particularly relevant for those topography information items that change over the course of time, such as weather-dependent rolling resistance coefficients or traction coefficients. Other data or information content of a data record can also be updated to support the accuracy of the method.

For example, a ground slope or a rolling resistance coefficient or a traction coefficient in the region of the cell can be used as topography information items of this cell. These topography information items can be provided without additional effort, because they are in any case often determined by default by corresponding electronics of the vehicle and are available in particular on an electronic bus (e.g., CAN) of the vehicle as data for specific control or regulation purposes.

The data record of a cell contains, in addition to at least one topography information item, at least one of the following information items:
  at least one position coordinate of the vehicle in the region of the cell, e.g., geographical latitude or geographical longitude or geographical altitude,
  a travel direction of the vehicle in the region of the cell,
  a counter status for detecting the number of previous travels into the cell or crossings of the cell by the vehicle,
  an identifier that identifies the cell.

The geographical latitude, longitude and altitude are advantageously adopted or derived from a satellite-based position detection system.

The counter for capturing the number of previous approaches or crossings of a given cell by the vehicle supports the determination of a realistic mean value for various topography information items in the course of a repeated working activity of the vehicle on the same trajectory or in the same cells. In addition, a probability function for determining the future travel position can be executed by means of the counter. For example, in the case of an impending crossing or fork, the data records for the cells in question can be used to check which travel direction (e.g., right, left, straight) is most frequently used after this crossing or fork in order to determine the most probable future travel position and corresponding cell. From the data record of this cell, additional topography information items can then be detected at the most probable future travel position.

In yet another embodiment, the at least one topography information item or the data record is a component of a database that is set up or stored on the vehicle or outside of the vehicle. For example, the database can be set up in an electronic unit (e.g., a microcontroller) of the vehicle. Alternatively, the database can be created in an external data storage facility (e.g., a data center of a vehicle fleet, a data cloud, and so forth). The database can contain topography information and additional data that is assigned to the geographical cells of interest only for the vehicle in question. The database can alternatively also contain the topography information items and additional data regarding other vehicles. Insofar as the database is set up on the vehicle, the topography information and the data records can be generated by technical functions of the vehicle itself (e.g., during the crossing of a cell) and stored in the database. Topography and terrain information supplied by other data sources can also be stored in the database.

The future travel position is determined as a function of at least one of the following variables:
  a current travel position of the vehicle,
  a current speed of the vehicle,
  a current acceleration of the vehicle,
  a current travel direction of the vehicle,
  a defined prediction time.

Other variables of the vehicle such as a current steering angle or a current yaw rate can also be considered. The above-mentioned variables of the vehicle are usually available by default in the electronics of the vehicle, so that no significant additional technical expense is necessary for determining the current values of these variables. The forecast time or prediction time can be defined or programmed in different ways depending on how much advance time is required for suitable processing of the predicted topography information for specific control or regulation purposes on the vehicle, in particular for the propulsion thereof.

For determining a future travel position or a future cell representing that position, the cell representing the current travel position of the vehicle or the data linked thereto may be used as a starting point. Alternatively, the future travel position or future cell can be determined depending on a cell that is arranged adjacent to the cell representing the current travel position. Thus, the method can be meaningfully carried out even if no data or no suitable data is present for the cell representing a current travel position.

In yet another embodiment, not only is the data record or the topography information of the determined future travel position or the determined future cell queried. Instead the data record or topography information thereof for at least one adjacent cell is queried. In this manner, the method can be meaningfully carried out even when the determined future travel position or determined future cell has not yet been assigned any data record or usable value of a topography information item. Then a topography information item of an adjacent cell is processed if necessary and consequently a larger tolerance range in the prediction of a topography information item at a determined future travel position or future cell is accepted.

An arrangement of cells along the travel route or travel direction of the vehicle is recorded as a cell sequence, e.g., stored in a database. In this way, an already traversed travel route based on successive cells can be recorded or stored. A recorded cell sequence, i.e., an already traversed travel route of the vehicle, can then be used as the basis for determining the future travel position or future cell. Depending on the nature of the determination, the contents of the associated data records can be queried or evaluated.

The cell sequence can be compared to cells of a travel route of the vehicle that is currently to be traversed. This comparison supports the determination of the future travel position, particularly for special travel situations. For example, the correct future travel position can be determined with a higher probability if the future travel position is located after a fork in the route or after a crossing.

In yet a further embodiment, a cell sequence contains a combination of two cells, namely the so-called starting cell and a subsequent cell along the travel route. These two cells can be linked to one another via a linking feature, e.g., by a transition counter, the counter status of which signals whether or how often a transition of the vehicle from the starting cell to a destination cell has taken place. After one trip or after multiple trips by the vehicle, a plurality of these cell sequences, i.e., interlinked starting and destination cells, have been recorded. Based on the linkages, the cell that represents the future travel position can be determined with a low data processing expense. In particular, this also enables easy determination of a future travel position after a fork or a crossing in the route.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
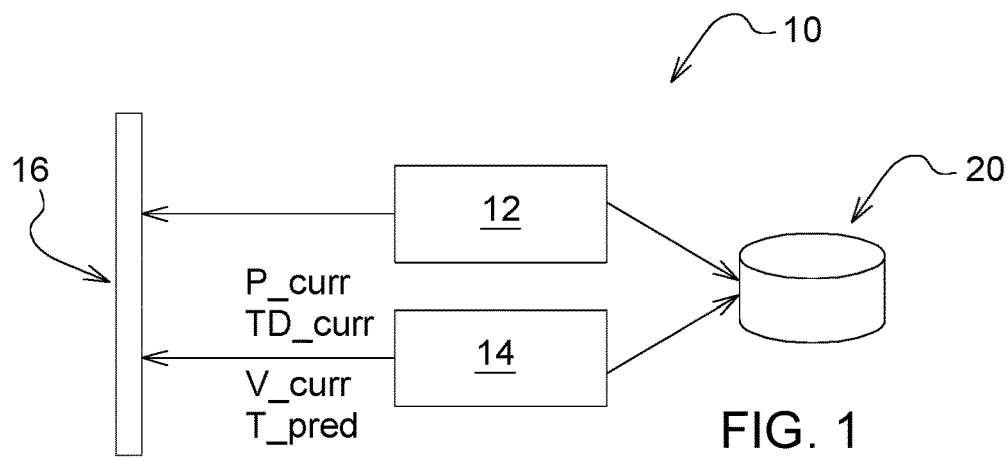
FIG. 1 shows a schematic arrangement with components for carrying out the method.

FIG. 1 schematically shows essential components of an arrangement 10 for carrying out the prediction method. The arrangement comprises, among other things, a cartography unit 12 and a prediction unit 14. Both the cartography unit 12 and the prediction unit 14 can access a control or data bus 16 (e.g., a CAN bus) of a vehicle 18. The cartography unit 12 and the prediction unit 14 each read the respectively relevant data.

For example, the cartography unit 12 captures the current position data or position coordinates of the vehicle 18 via the bus 16 and assigns them to certain cells yet to be described. Via the bus 16, the cartography unit 12 additionally obtains current topographical information items or data regarding the terrain in the region of a current travel position of the vehicle 18. The topographical information items are, for example, a ground slope GS, a rolling resistance coefficient C_roll and a traction coefficient C_tract. This data and additional relevant data is supplied on the bus 16 via technical means (e.g., sensors, receiving unit for satellite-based position detection) of the vehicle. The cartography unit 12 writes the received data, optionally in further-processed form, to a data memory or a database 20. Depending on the embodiment, the database 20 can be arranged internally in the vehicle or externally. The cartography unit 12 can overwrite individual data in the database 20. For example, individual data items can be updated by new measured values or by new averaging.

The prediction unit 14 detects via the bus 16 relevant data for determining a future travel position of the vehicle 18 or for determining a cell representing this future travel position. Relevant data can be, for example, a current travel position P_curr of the vehicle 18, a current speed v_curr of the vehicle 18, a current acceleration of the vehicle 18 and a current travel direction TD_curr of the vehicle 18. A defined prediction time point T_pred, which is available at the bus 16 or can be directly programmed at the prediction unit 14, can also be taken into consideration. In order to be able to predict a topographical information item, the prediction unit 14 processes the data received from the bus 16 and read out of the database 20. The predicted topography information items can be used to predict a drive power of the vehicle 18 that will be required at a future point in time and control it appropriately. For this purpose, the predicted topography information items can be output by the prediction unit 14 to the bus 16, for example, or transmitted directly to a controller of the drivetrain or to an engine controller.

The method proceeds from the consideration that many travel routes or travel paths, particularly for construction machines or agricultural vehicles, repeat in a similar or identical manner. These can be, for example, repeating transport trips on the same travel paths or a repeating agricultural cultivation on the same fields. One or more trips of the vehicle can therefore be initially used, in a type of cartography phase, by means of the cartography unit 12, to collect data and store the data in the database 20 for later prediction. Alternatively, the prediction function can already be active when the cartography function starts. However, no topography information can be predicted at that time because the cartography function has not yet created the necessary basic data.

Figure 2:
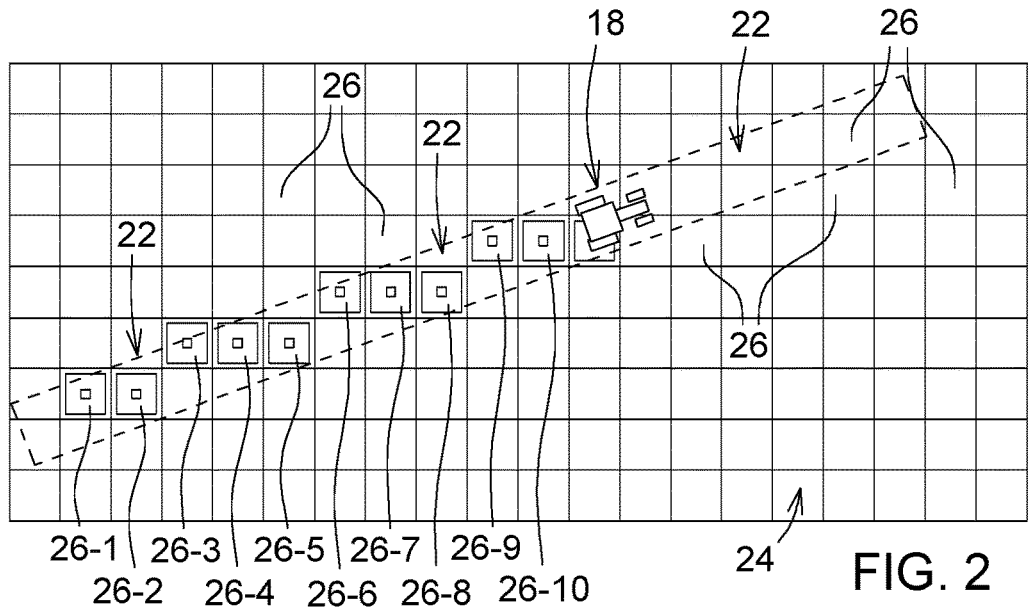
FIG. 2 shows a schematic representation of a geographical surface as a coordinate network having a plurality of network cells, and a vehicle during the recording of individual network cells.

The vehicle 18 is in a cartography phase in FIG. 2. In other words, the vehicle 18 is traversing a travel path or a travel route 22, during which the cartography unit 12 can receive data and store it in a database 20, as already mentioned. In this process, the vehicle 18 crosses a geographical surface 24 that is subdivided into a plurality of geographically different cells 26. Even if the individual cells 26 are shown as roughly square in the embodiment, they can cover different lengths and widths depending on the defined geographic coordinate network. The respective coordinate network is defined by the cartography unit 12.

In FIG. 2, along the travel route 22, the vehicle 18 has already passed through the cells 26-1, 26-2, 26-3, 26-4, 26-5, 26-6, 26-7, 26-8, 26-9 and 26-10 that are marked with a square dot in the center. Data is received and stored by the cartography unit 12 at a predetermined clock rate (e.g., once per second). With an appropriately adapted current speed v_curr of the vehicle 18, data for each cell 26-1 to 26-10, in particular topography information, can be generated and stored in the database 20. In this manner, a data record DR1 having a plurality of data items or information items can be generated, which is assigned to a cell 26 that has been crossed.

Figure 3:
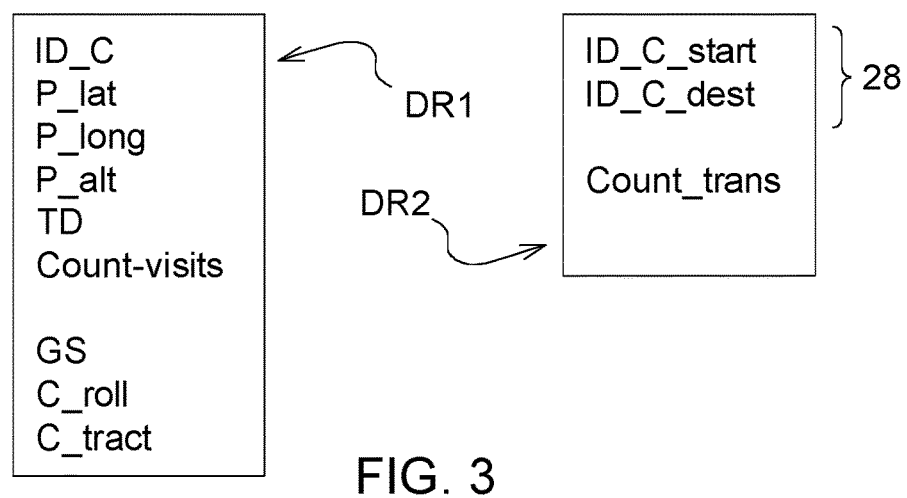
FIG. 3 shows a schematic representation of the contents of a database in which data assigned to individual network cells, and optionally further data, is stored, and FIGS. 4-9 each show a schematic geographical area with a vehicle during various prediction situations.

FIG. 3 shows a data record DR1 with data contents for the sake of example. The data record DR1 is assigned to a defined cell 26 via an identification code ID_C. Position coordinates P_lat (geographical latitude), P_long (geographical longitude) and P_alt (geographical altitude) indicate the position of the vehicle 18, at which defined topography information items within the respective cell are detected. For example, a ground slope GS, a rolling resistance coefficient C_roll and a traction coefficient C_tract are detected as the topography information items. In addition, a travel direction TD of the vehicle 18 at the detected travel position of the vehicle 18, or the directional vector, is detected. The above-mentioned data or information items of the data record DR1 can be updated in a repeated crossing of the same cell 26. For example, an old value can be replaced by a newly detected value or old values can be used together with a newly detected value for updated averaging. The data record DR1 additionally contains a counter Count_visits for detecting the number of previous crossings of the same cell 26 by the vehicle 18. In this manner, a respective data record DR1 is created for each of a plurality of crossed cells 26. The data record DR1 is unambiguously assigned to a cell 26 by the identification code ID_C, in such a manner that the values of the topography information items of a cell 26 are also assigned.

Optionally, an additional data record DR2 is generated, the data contents of which support, in an embodiment yet to be described, the determination of a future travel position or the determination of the corresponding future cell 26. The designation ID_C_start corresponds to the beginning of the identification code ID_C of a cell 26, which is referred to in relation to the traversed travel route 22 as a starting cell, while the designation ID_C_dest corresponds to the identification code ID_C of a cell 26 that is referred to as a destination cell in relation to the travel route 22. According to FIG. 2, the cell 26-1 is a starting cell, whereas the cell 26-2 is a destination cell. The cell 26-2 is in turn a starting cell relative to the cell 26-3, etc. These arrangements can be referred to as cell sequences 28, each containing two cells 26. Both cells ID_C_start and ID_C_dest are linked together by a counter Count_trans. This counter can signal whether, and if applicable, how often a transition of the vehicle 18 from the same starting cell to the same destination cell has taken place in the past.

In another embodiment, the individual data records DR1 for each cell 26 have already been generated with respect to their data structure when the surface 24 is divided into cells 26. Alternatively, a data record DR1 is only generated and assigned to a cell 26 if this cell 26 is being or has been crossed by the vehicle 18. In the latter case, actual values (e.g., measured values) can already be assigned to all variables of the data record DR1 when the data record DR1 is generated. Because of the number of theoretical combination possibilities of two cells 26 within the surface 24, the data record DR2 is only generated when a transition of the vehicle 18 between two cells 26 on the surface 24 has taken place.

Figure 4:
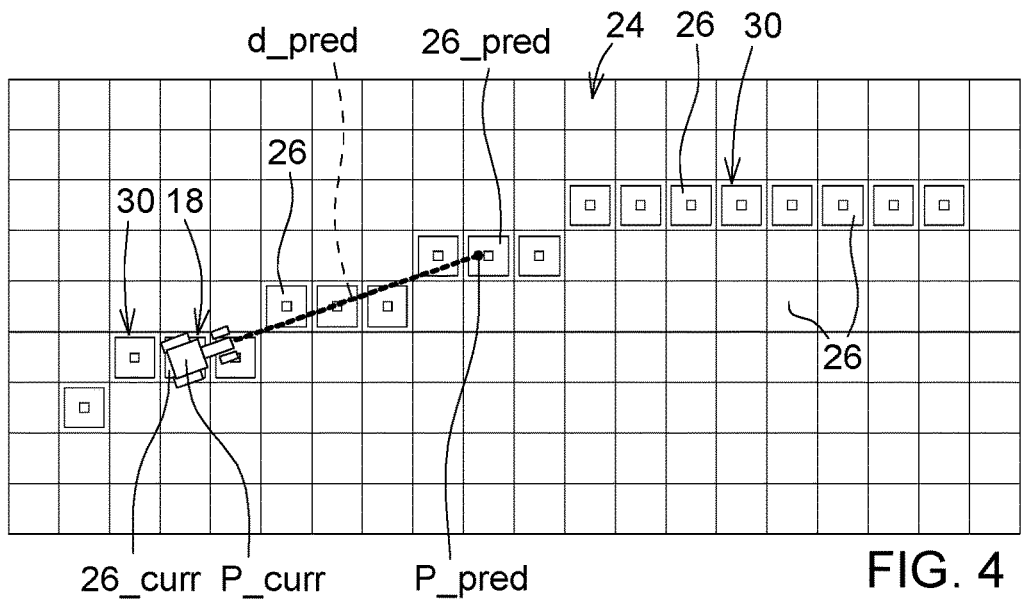

A prediction function is carried out in FIG. 4. Sequentially arranged cells 26 in the surface 24 are each marked with a central square dot. They form a component of a cell sequence 30 shown in part. These cells 26 have already been crossed by the vehicle 18 in one or more previous travel routes. Accordingly, topography information items have already been assigned to these cells 26. The vehicle 18 is in a current travel position P_curr within a cell 26. Proceeding from the current travel position P_curr, or from the current cell 26_curr representing it, and on the basis of additional variables, a future travel position P_pred, or a future cell 26_pred representing it, can be determined. These variables include a current travel direction TD_curr of the vehicle 18 or the directional vector thereof and a current speed v_curr, as well as a defined prediction time point T_pred. For this purpose, the prediction unit 14 can receive the values of the above-mentioned variables via the bus 16 (as indicated in FIG. 1) or via a different data interface. The prediction unit 14 processes the received data, by means of a suitable algorithm for example, and determines the future cell 26_pred or the future travel position P_pred. For this purpose, the prediction unit 14 also calculates or estimates a prediction distance d_pred, which is shown in FIG. 4 as a dash line between the current travel position P_curr and the future travel position P_pred. From the data record DR1 assigned to the determined cell 26_pred, at least one of the topography information items present is queried and consequently said topography information item (items) is/are predicted.

Figure 5:
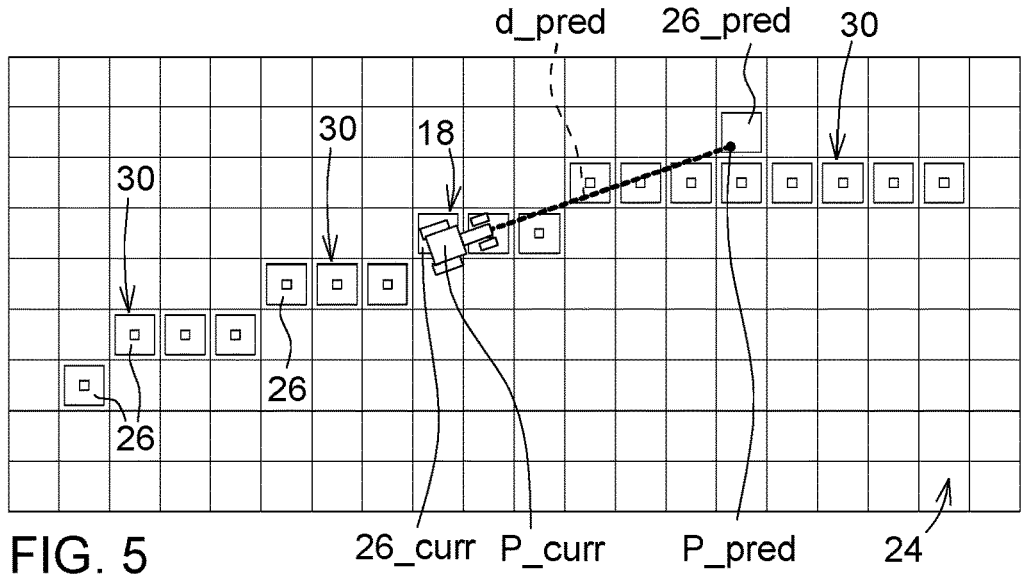

FIG. 5 shows an additional prediction situation. Analogously to FIG. 4, a future travel position P_pred, or a future cell 26_pred representing it, is determined for the vehicle 5. When querying the data record DR1 or the topography information item(s) of this future cell 26_pred, however, it is found that no topography information or no usable value of a topography information item has yet been assigned to this cell 26_pred. In the present case, this is because this determined future cell 26_pred lies outside the cell sequence 30 and therefore this cell 26_pred has not yet been mapped with topographic information in the manner described above.

Figure 6:
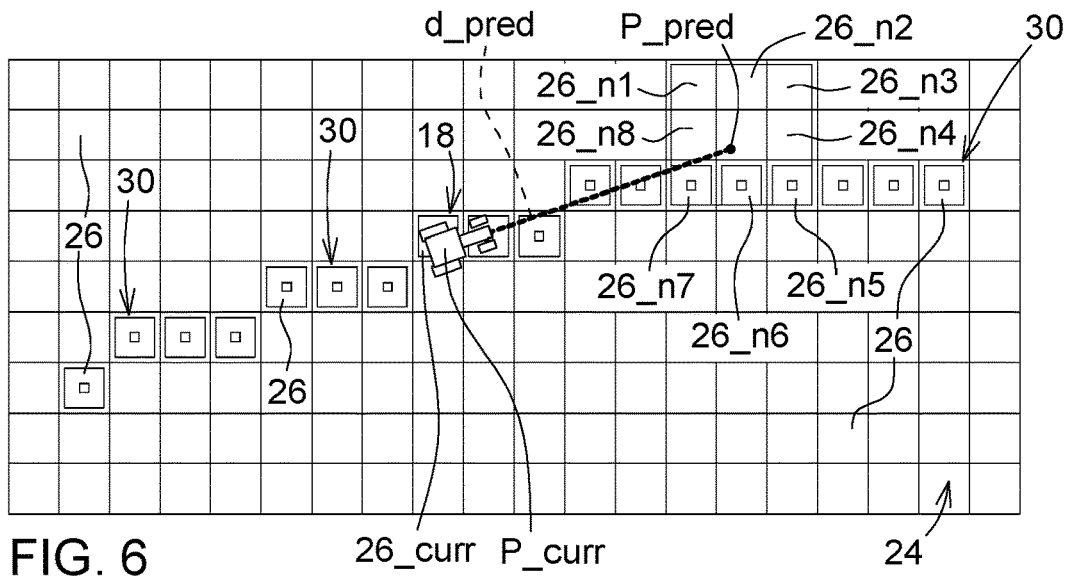

The problem described with FIG. 5 can be solved by additionally performing an environment search in a field with a defined number of cells 26 (in the embodiment according to FIG. 6: three times three cells 26) in order to find a usable topography information item. Thus, topography information items from at most eight adjacent cells 26_n1, 26_n2, 26_n3, 26_n4, 26_n5, 26_n6, 26_n7 and 26_n8 are queried in FIG. 6. By suitable data processing, it is determined that cell 26_n6 is the best approximation to the determined future cell 26_pred. Consequently, cell 26_n6 is selected for the prediction of a topography information item.

Figure 7:
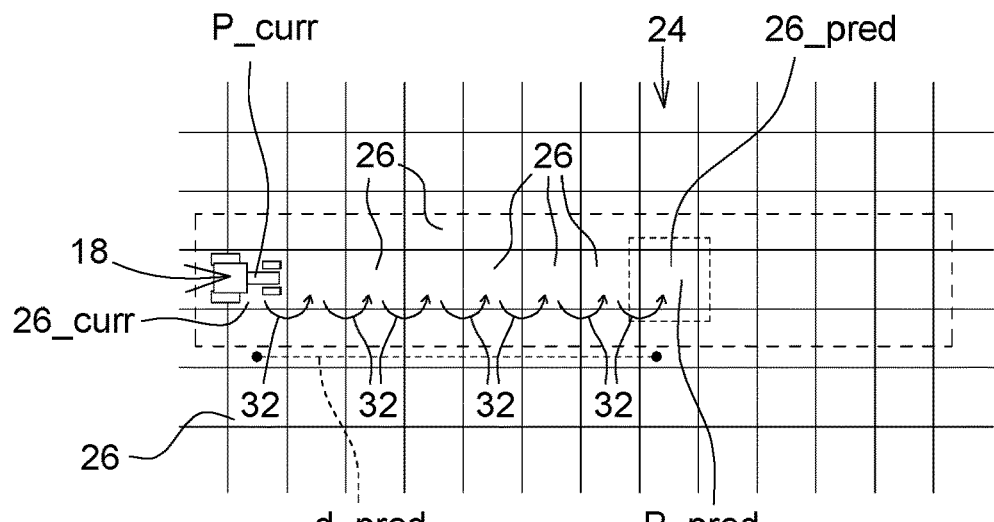

In FIG. 7, the prediction distance d_pred is again calculated or estimated proceeding from the current travel position P_curr of the vehicle 18 and depending on additional variables such as current travel speed v_curr and defined prediction time point T_pred. To determine the future cell 26_pred, a transition 32 between successive cells 26 that has already taken place in a previous travel route is taken into consideration. This transition 32 constitutes a linking feature between successive cells 26 and is represented by the data record DR2 or the counter Count_trans. Proceeding from the cell 26_curr representing the current travel position P_curr, cells 26 linked to one another are tracked by means of the known transitions until the summed-up distance between the cells 26 is at least equally large as the prediction distance. The final cell 26 in this summation corresponds to the future cell 26_pred to be determined or represents the future travel position P_pred to be determined.

Figure 8:
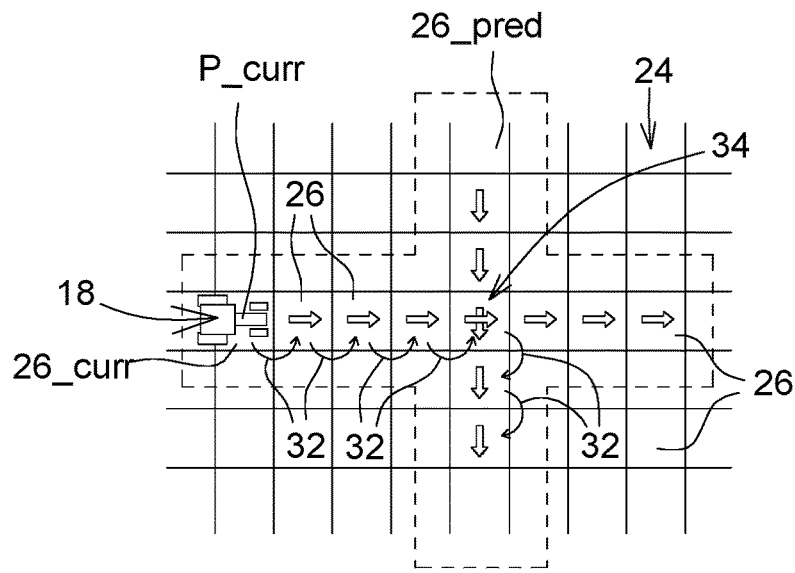

In another prediction situation, as shown in FIG. 8, the current travel position P_curr of the vehicle 18 is in front of an intersection 34. Due to the calculated or estimated prediction distance d_pred, the future travel position P_pred or the future cell 26_pred must be located following the intersection 34. To determine the future travel position P_pred or the future cell 26_pred that has the greatest probability, the transitions 32 between successive cells 26 can be used, as already explained with reference to FIG. 7.

Figure 9:
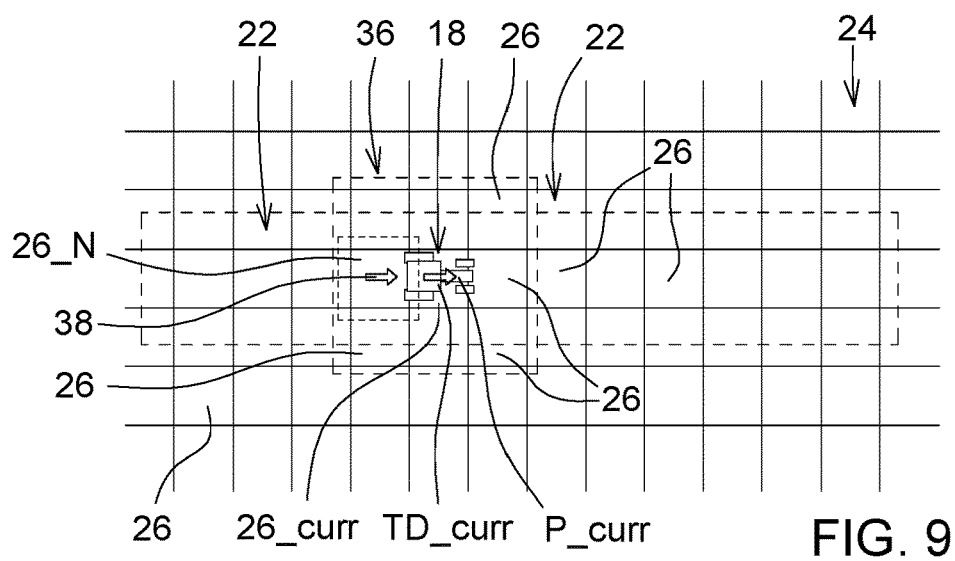

In FIG. 9, the current cell 26_curr, in which the vehicle 18 is located, has not yet been assigned a data record DR1 or a data record DR2. This is the case, for example, if the vehicle 18 has driven at a higher speed through the same travel route 22 in a previous cartography phase in the region of the current cell 26_curr. The future travel position P_pred or future cell 26_pred therefore cannot be determined on the basis of the current cell 26_curr. Therefore, a different cell 26 is sought, which is to be the starting point for the determination of a future travel position P_pred or future cell 26_pred. There is consequently an environment search around the vehicle 18 in a field 36 with a defined number of cells 26 (in the embodiment according to FIG. 9: three times three cells 26). It is determined by suitable data processing that the cell 26_N has been assigned a data record DR1 and possibly also a data record DR2, wherein the travel direction TD stored in the data record DR1, or the directional vector 38 thereof, coincides with the current travel direction TD_curr of the vehicle 18. This cell 26_N is arranged adjacently relative to the current cell 26_curr and is directly behind the current cell 26_curr as viewed in the current travel direction TD_curr. Taking into account a corresponding correction of the prediction distance d_pred, a future cell 26_pred can be determined as explained with reference to FIG. 7 for example.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for predicting a topography information item for a vehicle, comprising:
    defining via a controller an arrangement of geographically different cells representing different travel positions of the vehicle in a database;
    generating via the controller a respective data record including at least one respective topography information item during or after the crossing of each of the arrangement of geographically different cells;
    assigning via the controller the respective data record to each of the arrangement of geographically different cells in the database, wherein during or after a crossing of each of the arrangement of geographically different cells, the respective data record assigned to each cell is updated;
    determining a current travel position via the controller in communication with a satellite-based position detection system; and
    querying the database via the controller for the respective data record assigned to the cell representing the current travel position;
    determining a future travel position via the controller as a function of at least one of the current travel position of the vehicle, a current speed of the vehicle, a current acceleration of the vehicle, a current travel direction of the vehicle, and a defined prediction time; and
    querying the database via the controller for the respective data record assigned to the cell representing the determined future travel position;
    wherein, when the respective data record of the cell representing the current travel position is available, the at least one topography information item of the cell representing the current travel position of the vehicle is used;
    wherein, when the respective data record of the cell representing the current travel position is unavailable, the future travel position is determined based in part on selecting the respective data record of a cell arranged adjacent to the cell representing the current travel position of the vehicle;
    wherein, when the respective data record of the cell representing the future travel position is available, the at least one topography information item of the cell representing the future travel position is used;
    wherein, when the respective data record of the cell representing the future travel position is unavailable, the at least one topography information item of the cell representing the future travel position is predicted based in part on selecting the respective data record of a cell arranged adjacent to the cell representing the future travel position of the vehicle;
    and wherein a drive power of the vehicle is controlled via the controller to achieve a reduced fuel consumption along the travel path depending on the respective data record of the cell representing the current travel position and the respective data record of the cell representing the future travel position.

2. The method of claim 1, wherein the respective data record includes a position coordinate, a travel direction of the vehicle, a counter for detecting the number of previous crossings of the cell by the vehicle, and an identifier identifying this cell.

3. The method of claim 1, wherein the future travel position is determined as a function of a current travel position of the vehicle, a speed of the vehicle, a travel direction of the vehicle, and a defined prediction time point.

4. The method of claim 1, wherein an arrangement of cells along a travel route of the vehicle is recorded as a cell sequence.

5. The method of claim 4, wherein:
    the cell sequence contains a starting cell and a subsequent destination cell along the travel route as two cells, and
    the two cells are linked to one another by a linking feature, where the linking feature represents a transition of the vehicle from the starting cell to the destination cell along the travel route.

6. The method of claim 1, wherein the at least one topography information item comprises at least one of a ground slope, a rolling resistance coefficient, and a traction coefficient.

7. The method of claim 1, wherein the data record for each cell includes a travel direction of the vehicle.

8. The method of claim 1, wherein the data record for each cell includes a counter for the number of previous crossings of the cell.

9. The method of claim 1, wherein the data record for each cell includes a ground slope, a rolling resistance coefficient, a traction coefficient, a travel direction of the vehicle, and a counter for the number of previous crossings of the cell.

* * * * *